United States Patent [19]

Fair

[11] 4,442,916
[45] Apr. 17, 1984

[54] UNDERWATER SHEAR WAVE VIBRATOR COUPLING

[75] Inventor: Delbert W. Fair, Ponca City, Okla.

[73] Assignee: Conoco Inc., Ponca City, Okla.

[21] Appl. No.: 212,937

[22] Filed: Dec. 4, 1980

[51] Int. Cl.³ .......................... G01V 1/14; G01V 1/38
[52] U.S. Cl. ................................... 181/120; 181/114; 181/401; 181/402; 73/665; 367/75
[58] Field of Search ............... 181/113, 120, 121, 401, 181/402, 114; 73/665; 367/75; 248/503

[56] References Cited

U.S. PATENT DOCUMENTS

| | | | |
|---|---|---|---|
| 3,159,232 | 12/1964 | Fair | 181/401 |
| 3,372,770 | 3/1968 | Clynch | 181/401 |
| 3,717,217 | 2/1973 | Mueche et al. | 181/114 |
| 4,011,923 | 3/1977 | Talki et al. | 181/114 |
| 4,050,540 | 9/1977 | Chalet et al. | 181/401 |
| 4,064,964 | 12/1977 | Norden | 181/121 |
| 4,135,599 | 1/1979 | Fair | 73/665 |
| 4,219,096 | 8/1980 | Airhart | 181/402 |

Primary Examiner—Nelson Moskowitz
Attorney, Agent, or Firm—William J. Miller

[57] ABSTRACT

An underwater shear wave vibrator apparatus has a housing with a vibratory generating system mounted inside the housing for generating a force along an axis substantially parallel to the underwater seabed surface. A coupling apparatus which has an attachment surface and an underside surface for engaging the seabed is connected through a pivotal arm to the housing. A hydraulic apparatus is used for positioning the seabed engaging apparatus normal to the force axis of the vibratory generating apparatus by movement about the pivotal attachment so as to maintain contact of the seabed engaging apparatus with the seabed as the vibratory generating apparatus applies force against the seabed. Apparatus is also included for maintaining orientation of the underside surface of the positioning apparatus as the positioning apparatus moves the seabed engaging means.

17 Claims, 5 Drawing Figures

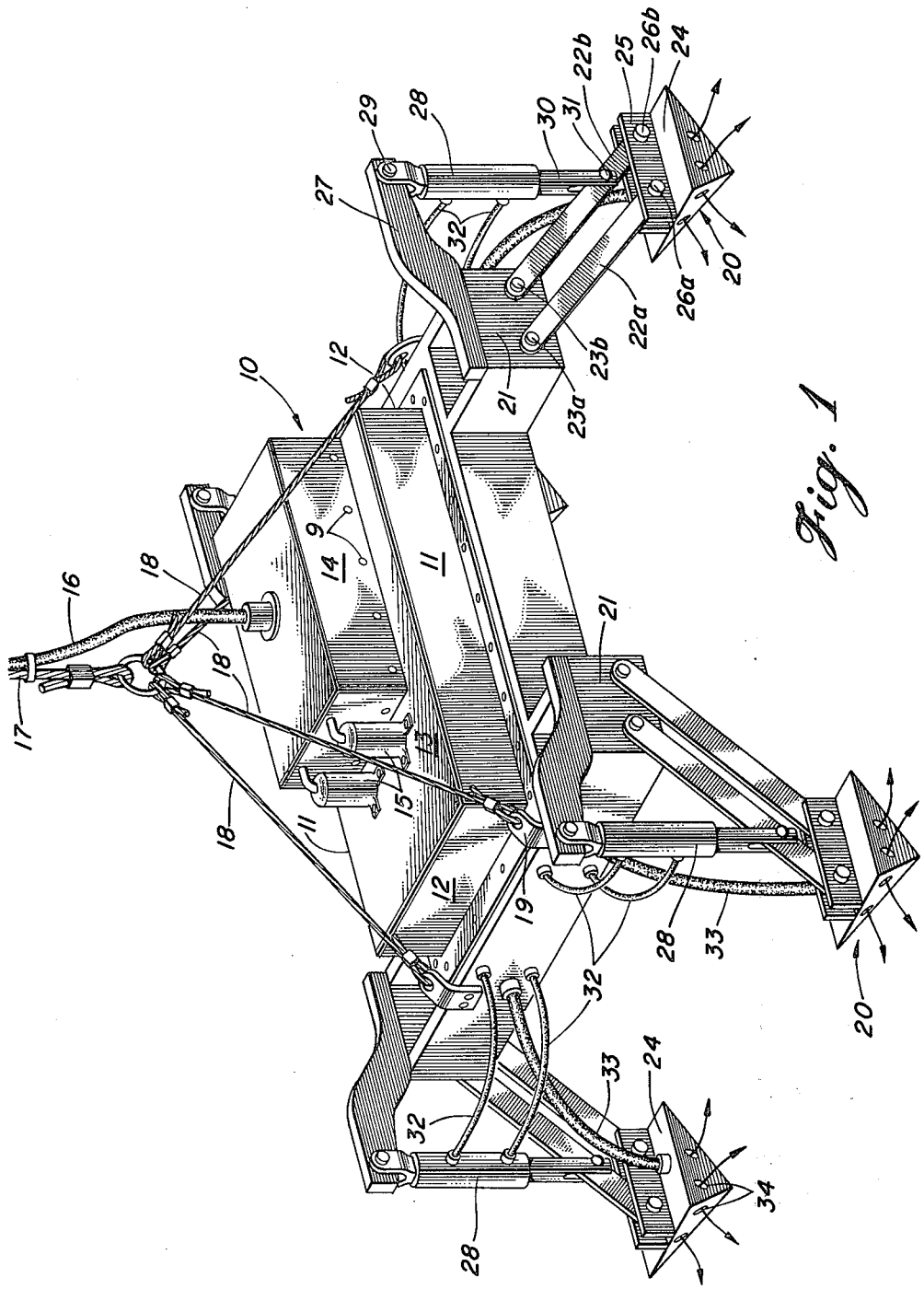

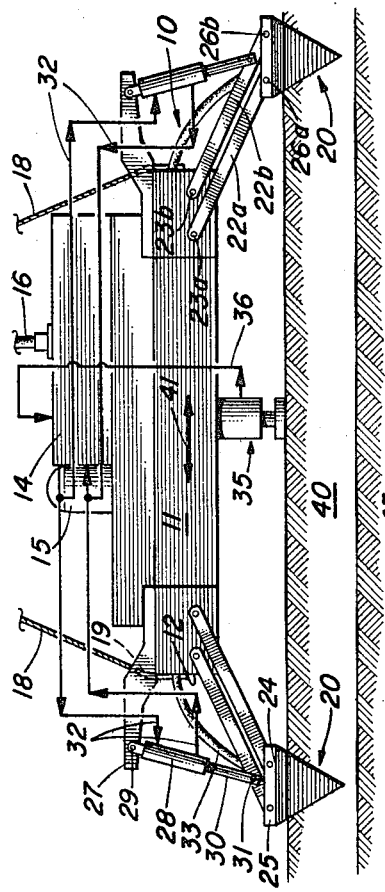
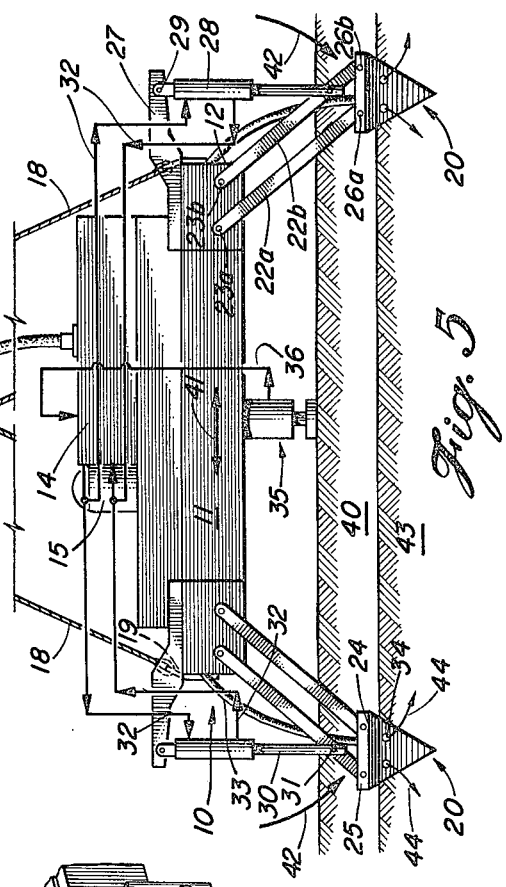
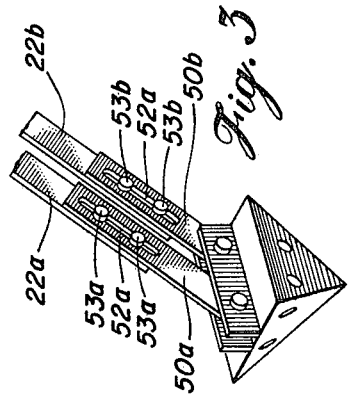
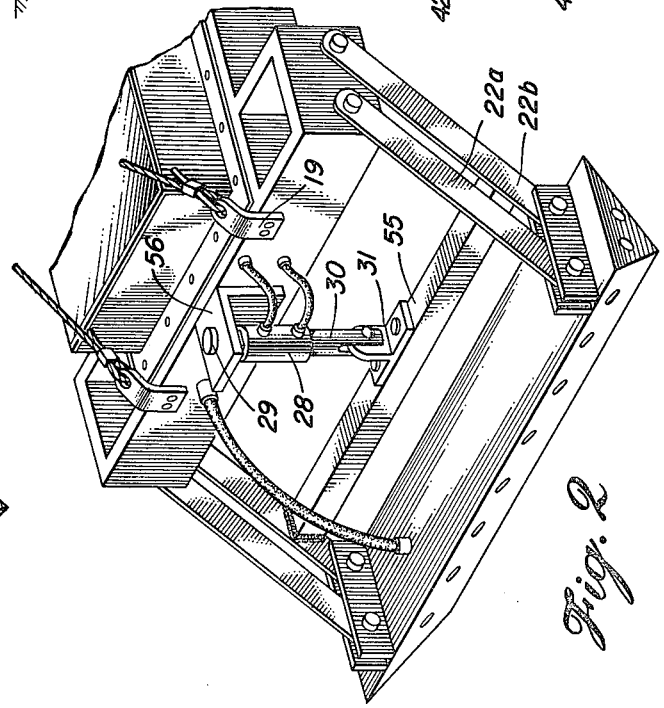

UNDERWATER SHEAR WAVE VIBRATOR COUPLING

DISCUSSION OF THE PRIOR ART

Shear wave vibrators are well known as exemplified by U.S. Pat. No. 4,135,599 issued Jan. 23, 1979, to Delbert W. Fair. Extendible hydraulically controlled apparatus for maintaining a shear wave with engagement with the surface of the earth is also illustrated in U.S. Pat. No. 3,372,770 to Frank Clynch. In the patent to Franch Clynch the extendible device positioned by the hydraulic pistons essentially comprises a pair of plates which are forced into the ground as the vibrator operates. The plates, which are forced into the ground, are intended to maintain contact with the ground during the period of time the shear wave vibrator is operating. Such a system, however, would not be satisfactory in the sea environment since the nature of the seabed is generally unconsolidated for a portion of the seabed and consolidated under the unconsolidated material. The device shown in the U.S. Pat. No. 3,372,770 patent would not operate to properly engage the seabed during operation of the shear wave vibrator.

BRIEF DESCRIPTION OF THE INVENTION

This invention basically discloses a means for coupling a shear wave vibrator to a seabed where the seabed will normally encompass a portion which is unconsolidated prior to reaching the consolidated seabed portion. The unconsolidated portion may be several inches to several feet in depth. If, for example, the unconsolidated portion is several feet in depth the vibrator will sink into the unconsolidated material, causing difficulties not only in operating the vibrator, but also its removal from the seabed unconsolidated material. In order to maintain contact throughout the vibrational operation of the shear wave vibrator engaging means, such as pyramidal structures, are coupled to the vibrator housing by means of arms which are pivoted both at the attaching point on the pyramidal upper surfaces and the side or at a convenient location on the housing. Hydraulic piston means is connected between the housing and the arms so that, as the vibrator tends to sink as it is being vibrated through the unconsolidated material, sensing means in the vibrator indicates that the vibrator housing has sunk to a depth where it is about to engage the unconsolidated material. Once this occurs, the hydraulic pistons begin to force the pyramidal coupling members into the unconsolidated material in a manner to prevent settling of the housing further toward the unconsolidated material. The sensing means on the housing will also prevent the housing from settling into the unconsolidated material as the vibrator pyramidal coupling apparatus engages the consolidated material and begins to work into the consolidated seabed.

BRIEF DESCRIPTION OF THE FIGURES

FIG. 1 is an orthogonal view of a vibrator illustrating the seabed pyramidal engaging means and the pivotal attachment between the upper surface of the pyramidal engaging means and the vibrator housing;

FIG. 2 shows a modified pyramidal engaging means;

FIG. 3 illustrates a means of extending the arm pivotally coupling the upper side of the pyramidal engaging means to the housing;

FIG. 4 shows the operation and position of the pyramidal engaging means in the unconsolidated material in a seabed and FIG. 5 shows the movement of the coupling arms as the pyramidal engaging means settles through the unconsolidated material and into the consolidated portion of the seabed.

DETAILED DESCRIPTION OF THE INVENTION

Referring to all of the FIGURES but in particular to FIG. 1, a housing generally referred to by the number 10 has sidewalls 11, end walls 12, and a top 13 which encloses the shear wave vibrator mass which is not illustrated in this application. Such a shear wave vibrator construction can be easily discerned by referring to the previously described U.S. Pat. No. 4,135,599 which illustrates the hydraulic arrangement coupled through the hold down apparatus to a pair of shafts spaced apart and through the mass. Proper operation of the hydraulic control causes the shafts to oscillate horizontally through the mass so that a shear wave is coupled to a ground engaging means and thereupon transmits a seismic shear wave to the earth.

The system in this application works substantially the same as the system in that patent and will not be described in detail.

Cover 14 is attached to the top of housing 10 by means of screws 9 or any suitable fastening device for enclosing the electronics for operating the vibrator, the electrical pump and hydraulic apparatus for generating the hydraulic pressure to cause the vibrator to function along with any other necessary pressure apparatus for maintaining the system within the cover and housing free of water.

Accumulators 15 are shown on the outside of cover 14. The accumulators can be mounted at any location, even inside cover 14, if desired. A cable 16 carries the necessary electrical power to operate the electric motors useful in generating the hydraulic pressure for the vibrator and may be used for any necessary functions requiring electricity or control within the vibrator housing. Cable 16 may also contain air lines for pressurizing the housing and the cover so that water may be forced out of the vibrator environment, thereby preventing contamination by salt of the necessary control and other apparatus useful in making the vibrator function.

It is obvious that sensors in the housing for determining pressure and hence the necessary air pressure needed to maintain the vibrators free of water can be maintained inside or outside of the housing and coupled through cable 16 to the surface.

The vibrator is shown supported by a single wire rope 17 coupled through four additional wire ropes 18 to brackets 19 to each corner of vibrator housing 10. The system shown for supporting the vibrator through cables 17 and 18 is merely elected for one means of supporting the vibrator. Other means can easily be used. For example, several cables can be used to support the vibrator. The vibrator can also be made mobile so that it can function by moving itself rather than being supported by a cable means.

The primary thrust of the invention is not in moving or supporting the vibrator but rather the method of coupling the vibrator to the seabed. In order to attach a plurality of pyramidal-shaped base plate earth coupling means to the vibrator, an attaching member 21 is formed on each corner of the housing 10. A pair of parallel-shaped arms 22a and 22b is attached at one end and to a pair of pivots 23a and 23b to attaching member 21. The other end of attaching member 22a and 22b is attached to the upper surface 24 of a pyramid-shaped earth coupling member 20 to a pair of brackets 25 and pivots 26a and 26b which are passed through brackets 25. Arms 22a and 22b are positioned through positioning apparatus comprising an arm 27 attached to attaching member 21 and a hydraulic cylinder 28 which has a piston rod 30 attached to pivotal connection 31 to arm 22b, for example. The other end of cylinder 28 is pivotally attached at 29 to arm 27. Hydraulic hoses 32 couple the hydraulic cylinder input and output to the interior of the housing 10 to the proper hydraulic control system for operation of hydraulic cylinder 28.

A fluidized system is provided for ease in the removal of the pyramidal-shaped earth coupling means 20 and comprises a hydraulic hose 33 coupled to the upper surface 24 of base plate member 20 and is coupled internally to a plurality of holes 34 in the side of the base plate earth coupling means 20. The hose 33 is coupled at the housing side to a fluid pump (not shown) which can be actuated as described under the operation portion of this specification. It should be understood that only one particular mechanical arrangement for the arm attachment 21 and positioning apparatus 27 and 28 is illustrated. Any form of mechanical equivalents are within the scope of this invention.

Referring to FIGS. 4 and 5, the position or pressure sensor is illustrated and is referred to generally by arrow 35 which is coupled through a communication means 36 such as an electrical signal through cover 14 to the cylinder control system for arms 22a and 22b.

OPERATION

The operation of the underwater vibrator shown in FIGS. 1 through 3 is better described by referring to FIGS. 4 and 5. In FIG. 4 the vibrator is shown with arms 22a and 22b in the fully retracted position with the wedge-shaped base plate earth coupling means 20 beneath a portion of the unconsolidated seabed 40. With operation of the vibrator accomplished by sending a signal down cable 16 along with the necessary electrical power, shear wave energy will be transmitted from the housing through arms 22a and 22b to the base plate earth coupling means 20. As the motion of the vibrators commences in the direction of the arrow 41, base plate coupling means 20 on each side of the vibrator will begin to settle into the unconsolidated material 40. Once the vibrator has settled to the point where the sensor 35 determines that it has reached the upper surface of the unconsolidated material, a signal will be sent up wire 36 to the control circuit contained under cover 14. These control circuits will transmit hydraulic fluid through pipe 32 to cylinder 28 causing the extension of rod 30 forcing pressure against parallelly spaced arms 22b. Pressure against arms 22b will cause the arms to rotate about pivots 23a and 23b and 26a and 26b in the direction of arrow 42 (see FIG. 5). Enough pressure will be applied to cause extension of the arms to the point where sensor 35 indicates that the vibrator is no longer settling into the unconsolidated material 40.

Once the base plate members 20 engages the consolidated portion of the undersea bed 43, they will not sink as rapidly as they did through the unconsolidated material but will tend to sink some amount as the vibrator continues to oscillate. The size of the base plate earth coupling means 20 will be dimensioned to adequately support the coupling during a normal vibrational cycle of the vibrator. Once the vibrational cycle is complete, force will be generated down fluid communication means such as hoses 33 to a port or opening 34. The fluid will be forced out of ports 34 in the direction of arrows 44, causing fluidization of the sea bottom 43 in the vicinity of the base plate earth coupling means 20. Once the earth is fluidized around the sides of the base plate earth coupling means 20, a signal can be transmitted to pistons 28 commanding the shaft 30 to be retracted moving arms 22a and 22b into the original retracted position. Simultaneously with the retraction or just prior to the retraction command, tension can be applied to wire cable or rope 17 pulling the vibrator through the unconsolidated portion 40 of the seabed and into a new position where seismic energy is desired to be transmitted into the seabed.

Referring to FIG. 3 a modification in the arms 22a and 22b is illustrated. In this embodiment a sliding portion 50a is attached to 22a and 50b is attached to 22b. Slots 51a and 52a are made through arms 50a and 50b and then secured to 22a and 22b by means of bolts 53a and 53b. This adjustment provides the extension of arms 22a in case the unconsolidated portion 40 has a much greater depth than anticipated, thus providing for additional depth for extending the base plate earth coupling means so that it can adequately reach consolidated material 43.

A modified version of the pyramidal base plate earth coupling means is shown in FIG. 2. In that arrangement a continuous wedge-shaped base plate is connected between arms 22a and 22b on each side of the housing 10. This elongated or wedge-shaped earth coupling means will provide additional coupling area if needed. It is also noted in this embodiment that a single cylinder 28 can be used for coupling wedge position control through a bar 55 mounted between arms 22b and then attaching shaft 30 to pivotal arrangement 31 to bar 55. An L-shaped bracket 56 can be used to couple cylinder 28 to a pivot 29 such as disclosed in FIG. 1.

A particular mechanical configuration has been illustrated having the base plate coupling means disclosed in this undersea vibrator. It is obvious that the invention is not so limited as to the particular mechanical configuration illustrated. For example, arms 22a and 22b can be connected directly to the to the sidewall 11 of housing 10 without the extension attaching member 21.

Other means of attaching the base plate or wedge-shaped coupling means 20 can be utilized. The basic concept of the invention is the extendible base plate earth coupling means which are pivotally attached to the housing 10 in a manner to provide accommodation of the unconsolidated material while maintaining the vibrator housing out of the unconsolidated material during its operation.

It is obvious that changes can be made in the application and still be within the spirit and scope of the invention as disclosed in the specification and appended claims.

What is claimed is:

1. An underwater shear wave vibrator apparatus for generating a shear wave force into a seabed, said vibrator including a housing having sidewalls, a top and a bottom, a vibratory generating means mounted inside said housing for generating a force along an axis substantially parallel to said seabed surface and a seabed engagement means having an attachment surface and an underside surface for engaging said seabed, an improvement in attaching said seabed engagement means to said housing comprising:
 (a) arm means;
 (b) means for pivotally attaching said arm means at one end to said housing and pivotally attaching the other end to said attachment surface of said seabed engaging means;
 (c) means for positioning said seabed engaging means normal to the force axis of said vibratory generating means by movement about said pivotal attachment to maintain contact of said seabed engagement means with said seabed as said vibratory generating means is applying force against said seabed; and
 (d) sensing means for maintaining the orientation of said underside surface as said positioning means moves said seabed engaging means.

2. Apparatus as described in claim 1 wherein said arm means comprise two parallel bars of the same length.

3. Apparatus as described in claim 1 or 2 where said arm means is adjustable in length.

4. Apparatus as described in claim 1 wherein two pairs of arm means are attached, one pair at each end to oppositely facing sidewalls of said housing.

5. Apparatus as described in claim 4 wherein each arm of said pair of arm means is made of two parallelly spaced bars.

6. Apparatus as described in claim 5 wherein said bars are adjustable in length to accommodate an increased depth of unconsolidated seabed.

7. Apparatus as described in claim 4, 5, or 6 wherein said seabed coupling means comprises pyramidal forms, each form having its apex oriented normal to the surface of the seabed.

8. An underwater shear wave vibrator apparatus comprising:
 (a) a housing having sidewalls, end walls, top and bottom;
 (b) a vibratory generating means mounted inside said housing and oriented to generate a force parallel to the top and bottom of said housing and along an axis normal to said end walls;
 (c) hydraulic means coupled to said vibratory generating means for operating said vibratory generating means;
 (d) means attached to said housing for moving said underwater shear wave vibrator from one location to another location;
 (e) seabed engaging means;
 (f) arm means pivotally coupling both said seabed engaging means to each sidewall and said housing at each end of said housing; and
 (g) means attached between said housing and said arm means for positioning said seabed engaging means with respect to said housing, whereby as said engaging means settles through the unconsolidated portion of the seabed and into the consolidated position of said seabed, said positioning means will maintain said housing away from said seabed.

9. Apparatus as described in claim 8 wherein said arm means comprise two parallel bars of the same length.

10. Apparatus as described in claim 8 or 9 where said arm means are adjustable in length.

11. Apparatus as described in claim 8 wherein two pairs of arm means are attached, one pair at each end to oppositely facing sidewalls of said housing.

12. Apparatus as described in claim 11 wherein each arm means of said pair of arm means is made of two parallelly spaced bars.

13. Apparatus as described in claim 12 wherein said bars are adjustable in length to accommodate an increased depth of unconsolidated seabed.

14. Apparatus as described in claim 11, 12, or 13 wherein said seabed coupling means comprises pyramidal forms, each of said forms having its apex oriented normal to the surface of the seabed with its base attached to each of said arm means.

15. Apparatus according to claim 1 or 8 wherein said seabed engaging means is pyramidal shaped with the axis through the base and apex normal to the surface of the seabed and wherein said arm means is attached to said base; opening means through the side of said pyramid; fluid communication means coupled between said housing and said opening means, whereby fluid can be forced down said fluid communication means and out said opening to fluidize the surrounding seabed to facilitate removal of said seabed engaging means therefrom.

16. Apparatus as described in claims 1 or 8 including seabed sensing means mounted on said housing to sense the location of said seabed with respect to the bottom of said housing, and means coupled from said sensing means to said positioning means to maintain the bottom of said housing a predetermined distance above said seabed.

17. An underwater shear wave vibrator apparatus including a housing having sidewalls, a top and a bottom, a vibratory generating means mounted inside said housing for generating a force along an axis substantially parallel to the seabed surface, and a coupling means having an attachment surface and an underside surface for engaging the seabed, an improvement in removing said coupling means comprising:
 (a) a plurality of spaced opening means formed around the underside surface of said engaging means, and
 (b) fluid communication means coupled to said opening, whereby fluid can be forced down said fluid communication means and out said opening to fluidize the surrounding seabed to facilitate removal of said seabed engaging means therefrom.

* * * * *